United States Patent
Herzog et al.

(10) Patent No.: US 12,552,741 B2
(45) Date of Patent: Feb. 17, 2026

(54) PRODUCTION OF DINITRILES

(71) Applicant: INV NYLON CHEMICALS AMERICAS, LLC, Wilmington, DE (US)

(72) Inventors: Benjamin David Herzog, Wichita, KS (US); Milind V. Kantak, Wilmington, DE (US); Gregory S. Kirby, Avondale, PA (US); William J. Tenn, III, Beaumont, TX (US)

(73) Assignee: INV Nylon Chemicals Americas, LLC, Wilmington, DE (US)

( * ) Notice: Subject to any disclaimer, the term of this patent is extended or adjusted under 35 U.S.C. 154(b) by 614 days.

(21) Appl. No.: 18/011,532

(22) PCT Filed: Jul. 30, 2021

(86) PCT No.: PCT/IB2021/056990
§ 371 (c)(1),
(2) Date: Dec. 20, 2022

(87) PCT Pub. No.: WO2022/029583
PCT Pub. Date: Feb. 10, 2022

(65) Prior Publication Data
US 2023/0303484 A1 Sep. 28, 2023

Related U.S. Application Data

(60) Provisional application No. 63/062,763, filed on Aug. 7, 2020, provisional application No. 63/226,351, filed on Jul. 28, 2021.

(51) Int. Cl.
*C07C 253/24* (2006.01)
*C07C 255/04* (2006.01)
(52) U.S. Cl.
CPC .......... *C07C 253/24* (2013.01); *C07C 255/04* (2013.01)

(58) Field of Classification Search
CPC .......................... C07C 253/24; C07C 255/04
See application file for complete search history.

(56) References Cited

U.S. PATENT DOCUMENTS

| | | |
|---|---|---|
| 2,439,513 A | 4/1948 | Hamblet et al. |
| 2,557,282 A | 6/1951 | Hamblet et al. |
| 2,791,566 A | 5/1957 | George |
| 2,840,607 A | 6/1958 | Attane, Jr. et al. |
| 2,971,010 A | 2/1961 | Gilby, Jr. et al. |
| 3,338,959 A | 8/1967 | Thomas et al. |
| 3,624,125 A | 11/1971 | Barnett et al. |
| 3,627,817 A | 12/1971 | Barnett et al. |
| 3,818,066 A | 6/1974 | Barnett et al. |
| 3,907,860 A | 9/1975 | Mee |
| 4,058,555 A | 11/1977 | Mims |
| 6,518,463 B2 | 2/2003 | Wachs et al. |
| 2016/0289656 A1 | 10/2016 | Pearlman et al. |

FOREIGN PATENT DOCUMENTS

| | | |
|---|---|---|
| CN | 105017070 A | 11/2015 |
| CN | 106430245 A | 2/2017 |
| CN | 108530318 A | 9/2018 |
| CN | 109956888 A | 7/2019 |
| JP | 2001348370 A | 12/2001 |

OTHER PUBLICATIONS

J. P. Oppenheim, et al., "Adipic Acid", Kirk-Othmer Encyclopedia of Chemical Technology, Mar. 14, 2003, 27 pages.

*Primary Examiner* — Laura L Stockton

(57) ABSTRACT

A process for producing dinitrile comprises supplying a C6 organic compound, an oxidizing agent, ammonia and a diluent to a reaction zone to produce a reaction mixture and contacting the reaction mixture in the reaction zone with a heterogeneous catalyst at a temperature from 50 to 200° C. to convert at least a portion of the C6 organic compound to dinitrile and water and produce a reaction effluent. At least part of the reaction effluent is supplied to a separation system to separate at least dinitrile and unreacted ammonia from the reaction effluent and additional water is supplied to a portion of the reaction effluent prior to or during separation of unreacted ammonia from the reaction effluent.

15 Claims, 3 Drawing Sheets

PRODUCTION OF DINITRILES

RELATED APPLICATIONS

This application is a national phase of PCT/IB2021/056990, filed on Jul. 30, 2021, which claims priority to United States Provisional Applications No. 63/062,763 and 63/226,351, filed on Aug. 7, 2020 and Jul. 28, 2021, respectively.

FIELD

The present application relates to a process for producing dinitriles.

BACKGROUND

Dinitriles such as adiponitrile and methylglutaronitrile are important intermediates in the production of monomers for nylons and polyurethanes. For example, adiponitrile (ADN) is an important intermediate in the production of hexamethylenediamine (HMDA), which is one of the monomers used in the production of nylon-6,6; a copolymer of HMDA and adipic acid (AA). Historically, nylon-6,6 was used primarily to form carpet fibers used in high quality rugs for residential applications and in fibers for clothing. More recently, nylon-6,6 has been used as an engineering resin in demanding high-temperature automotive 'under the hood' applications such as linings for hydraulic brake lines, cable and wire insulation, and molded parts such as radiator housings.

One known method of producing adiponitrile involves the reaction of a $C_6$ organic feedstock, such as cyclohexane, cyclohexanol or cyclohexanone, with ammonia and oxygen in the presence of heterogeneous catalyst, such as one or more metal oxides. Such ammoxidation processes have historically been conducted at high temperatures in the gas phase. For example, U.S. Pat. No. 3,818,066 discloses a process for the preparation of adiponitrile which comprises contacting a gaseous mixture consisting essentially of cyclohexane, ammonia and oxygen at a temperature of 300 to 700° C. with a solid catalyst consisting essentially of (1) antimony oxide, molybdenum oxide, and (3) a mixture of antimony oxide and the oxide of a metal selected from the group consisting of tin, titanium, and uranium. U.S. Pat. Nos. 3,627,817 and 3,624,125 disclose similar processes using cyclohexane/cyclohexene and methyl-cyclohexane respectively as the $C_6$ organic feedstock.

More recently, interest has focused on ammoxidation processes which can be conducted at lower temperatures such that the organic feedstock is at least predominantly in the liquid phase. For example, CN108530318A discloses the production of adiponitrile by the liquid-phase ammoxidation of cyclohexene at a temperature of 120 to 140° C. in the presence of a 3,5-bis-trifluoromethyl-4-n-butylbenzene selenous acid catalyst. CN105017070A discloses the liquid-phase ammoxidation of 1,6-hexanediol to adiponitrile over transition-metal oxide catalysts at a temperature of 30 to 180° C. in the presence of a low boiling point alcohol, ether, nitrile or hydrocarbon as a solvent. A similar process using cyclohexanol as the feedstock is disclosed in CN109956888A.

Despite these recent advances there remains considerable interest in finding improved ammoxidation processes for the production of adiponitrile and in particular in achieving improvements in the utilization of expensive raw materials.

SUMMARY

In accordance with the present application, it has now been found that the recovery of unreacted ammonia from the reaction effluent of a liquid phase ammoxidation process for the production of dinitrile is improved if water is added to the reaction effluent. This improvement is surprising and counter-intuitive since water is a byproduct of the ammoxidation reaction and so must be removed during product recovery to yield a high purity dinitrile product.

Thus, in one aspect, the present application resides in a process for producing dinitrile comprising:
- (a) supplying a $C_6$ organic compound, an oxidizing agent, ammonia and a diluent to a reaction zone to produce a reaction mixture;
- (b) contacting the reaction mixture in the reaction zone with a heterogeneous catalyst at a temperature from 50 to 200° C. to convert at least a portion of the $C_6$ organic compound to a dinitrile and water and produce a reaction effluent; and
- (c) supplying at least part of the reaction effluent to a separation system to separate at least (i) the dinitrile, and (ii) unreacted ammonia from the reaction effluent, wherein additional water is supplied to a portion of the reaction effluent prior to or during separation of unreacted ammonia in (c)(ii).

The process suitably produces linear or branched dinitrile. For a $C_6$ feed, adiponitrile, ethylsuccinonitrile and methylglutaronitrile are suitable products.

Suitable $C_6$ organic compounds include those selected from the group consisting of cyclohexane, cyclohexene, cyclohexadiene, hexanediol, cyclohexanol, cyclohexanone, benzene, caprolactam, hydroxycaproic acid and mixtures thereof.

Suitable diluents can form an azeotrope with water. For example, a suitable diluent can have a normal boiling point below that of the product dinitrile. Examples of suitable diluents include one or more of acetonitrile, acrylonitrile, toluene, dioxane, m-xylene, N,N-dimethylformamide and N-methyl pyrrolidone.

The diluent may optionally comprise a dinitrile such as adiponitrile or methylglutaronitrile.

The oxidizing agent can comprise at least one of oxygen; a nitrogen oxide; nitrous oxide ($N_2O$); hydrogen peroxide; and an organic hydroperoxide, examples of which include cyclohexyl-hydroperoxide [CHHP] and cumene hydroperoxide.

The catalyst can comprise one or more metals, for example, those selected from transition metals, precious metals and mixtures thereof. Metal oxides are also suitable including mixed metal oxides. The catalyst can be in a solid particulate form. Smaller particle sizes are suitable for use in a slurry while larger particle sizes, such as extrudates, tablets, or spheres, are suitable for use in a fixed bed.

Before separating the reaction effluent (in step (c), above) the process can include supplying at least a portion of the reaction effluent to a solid separation step to remove at least part of the catalyst. Solid separation steps can include those known to the skilled artisan such as separation by particle size and separation by density. Separation by particle size is conventionally performed using a suitable single-stage or multiple-stage filtration device. Separation by density is conventionally performed in devices such as decanters, gravity settlers, cyclones and centrifuges. The combination of the two separation approaches is also known in the conventional art of solids separation from liquids and gases.

When the additional water is added to the reaction effluent, the additional water can be supplied to a gaseous portion of the reaction effluent in a condenser. The unreacted ammonia may then be removed from the reaction effluent portion as an aqueous ammonia-containing condensate.

Benefits of the disclosed process can include reduction in use of methane and HCN. Oxidizing agents useful in the disclosed process, including nitrogen oxide and nitrous oxide, can be recovered from manufacturing operations and consumed as useful feedstocks. In an embodiment in which the nitrile product itself is used as diluent, the introduction of an addition solvent is avoided. Efficient recovery of unreacted ammonia from the reaction effluent and its recycle/reuse back in the reaction zone provides a double benefit, i.e., it reduces the overall ammonia feed while curtailing ammonia levels in the offgas disposal systems.

DETAILED DESCRIPTION OF THE EMBODIMENTS

Figure 1:
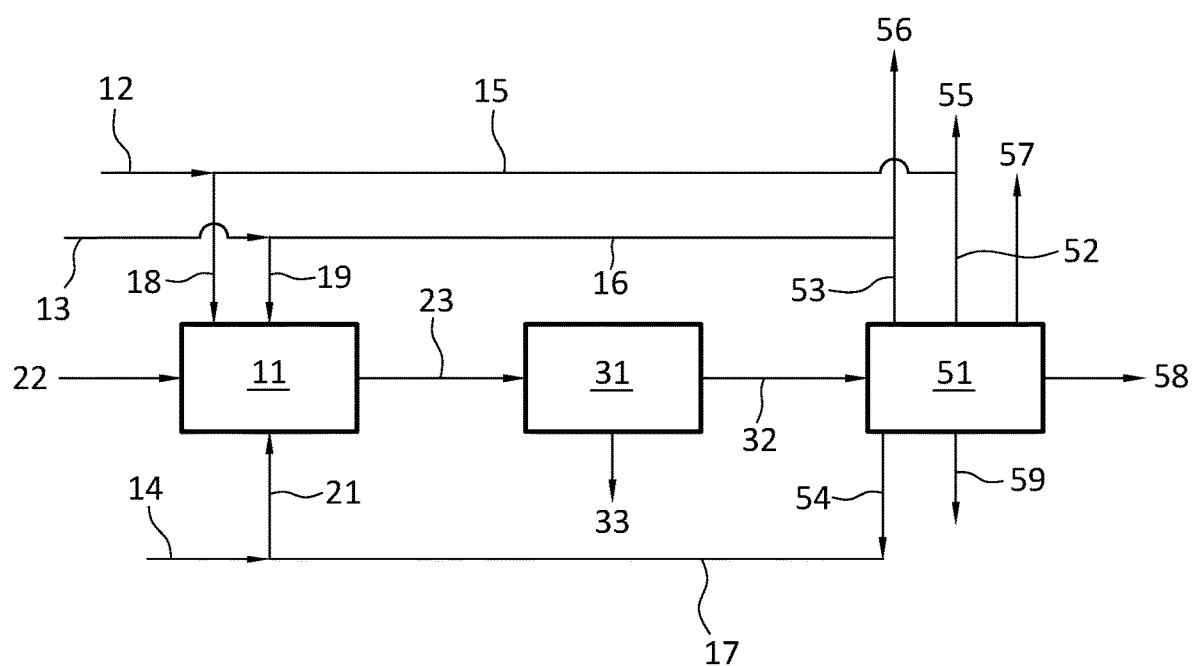
FIG. 1 is a simplified block diagram of a process for producing dinitrile according to the present disclosure.

Described herein is a process for producing a dinitrile, in which a $C_6$ organic compound, an oxidizing agent, ammonia and a diluent are supplied to a reaction zone to produce a reaction mixture, which is then contacted with a heterogeneous catalyst in the reaction zone at a temperature from 50 to 200° C. to convert at least a portion of the $C_6$ organic compound to a product dinitrile and water. The reaction effluent is then supplied to a separation system which separates at least (i) the product dinitrile, and (ii) unreacted ammonia from the reaction effluent. Surprisingly, by feeding additional water to the reaction effluent prior to or during the ammonia separation, it is found that the efficiency of this separation is improved and the percentage recovery of the unreacted ammonia present in the reacting effluent is significantly increased. The recovered ammonia is then generally recycled to the ammoxidation process.

Feedstocks

Suitable feedstocks for the present process include $C_6$ hydrocarbons and other $C_6$ carbon-containing materials such as alkanes, alkenes, aromatics, alcohols, ketones and lactams, merely to name a few examples. Specific examples of suitable feedstocks include:

Cyclic alkanes such as cyclohexane;
Mono- or poly-alcohols such hexanediol;
Cyclic alkane alcohols such as cyclohexanol;
Cyclic alkane ketones such as cyclohexanone;
Aromatics such as benzene;
Mixtures of two or more of the foregoing feeds such as cyclohexanol and cyclohexanone;
Cyclic olefins such as cyclohexene and cyclohexadiene;
Lactams such as caprolactam;
Mixed cyclic $C_6$ compounds, for example, a mixed stream containing cyclohexene, cyclohexane, cyclohexadiene and benzene.

Mixtures of cyclohexanol (defined as "A") and cyclohexanone (defined as "K") may be available from an adipic acid or caprolactam production facility, wherein such mixture is typically known as K/A oil. To make adipic acid, the KA oil is oxidized in a subsequent step to adipic acid via nitric acid oxidation. For caprolactam, the cyclohexanone is separated from the KA oil by distillation and is converted to caprolactam through several well-known steps (Oppenheim, J. P. and Dickerson, G. L. 2003. Adipic Acid. Kirk-Othmer Encyclopedia of Chemical Technology). The process and various improvements have been disclosed in U.S. Pat. Nos. 2,439,513; 2,557,282; 2,791,566; 2,840,607; 2,971,010, 3,338,959 and US20160289656. In the air oxidation of cyclohexane to KA oil, significant volumes of waste streams are produced and are comprised of mixtures of dicarboxylic acids, monoacids, hydroxy acids, cyclohexanone, cyclohexanol, and esters/oligomers of such. These waste streams are called non-volatile residue (NVR), water wash, or cyclohexane oxidation process (COP) acid streams. There have been numerous publications on chemical methods and processes for recovering material from these mixtures, such as U.S. Pat. No. 4,058,555. These oxygenated waste streams can be useful feeds in the presently disclosed process for making amides (such as 6-aminocaproamide) and nitriles, such as dinitriles including ADN.

In some embodiments, the carbon feedstock conversion in the ammoxidation reactor is not complete (i.e., less than 100% conversion), for example, 25% or 35% or 50% or 60% or 75% conversion. Therefore, it may be economically desirable to recover and recycle most of the unreacted carbon feed to the ammoxidation reactor. Purging of some of the recycled carbon feed stream may be necessary in order to maintain close-boiling impurity levels in the recycle feed to a minimum. A fresh make-up feed to the reaction would close the overall carbon feed balance and meet the production quantities.

The disclosed process can receive ammonia in any suitable form consistent with holding the other reactants under reaction conditions, for example, in the liquid phase in contact with a heterogeneous catalyst. Ammonia can be delivered to the reaction zone in aqueous or anhydrous form.

In some embodiments, ammonia ($NH_3$) is fed to the reactor in excess. Recovery of unreacted $NH_3$ from the reactor effluent, in a form that it can be recycled to the reactor, would be economically desirable in order to reduce the required amount of make-up $NH_3$ feed to the reactor.

In some embodiments, the ratio of ammonia to carbon-containing feedstock supplied to the reaction zone may be in the 0.1 to 10 (wt/wt) range, for example in the 0.5 to 10 (wt/wt) range, such as in the 0.8 to 10 (wt/wt) range. There is no limit of how much ammonia excess one can use other than for economic and practicality reasons. Any unutilized excess ammonia may undergo downstream recovery for recycle.

Where the oxidizing agent is oxygen, the disclosed process can receive oxygen as neat oxygen or a mixture of oxygen with an inert gas such as nitrogen. Air can be a suitable source of oxygen for the disclosed process. Oxygen can also be made available in-situ and supplemented to the reaction by feeding oxygenated materials, such as alcohols, acids, etc. Other non-limiting examples of suitable oxidizing agents include $H_2O_2$, organic peroxides, a nitrogen oxide, $N_2O$, or an organic hydroperoxide such as cyclohexylhydroperoxide [CHHP, typically formed during the cyclohexane oxidation step of adipic acid or caprolactam synthesis] and cumene hydroperoxide.

Air (oxidant) may be fed to the reactor in excess to ensure a high conversion of ammoxidation reactant to desired product ADN. A skilled person may appreciate a need to balance losses of lower-boiling volatile components (e.g., $NH_3$) with non-condensable gas vent streams with the excess air [resulting in high flow rates of nitrogen and unreacted oxygen].

In some embodiments, the ratio of air [when used as an oxidant] to the carbon feedstock supplied to the reaction zone may be in the 0.2 to 20 (wt/wt) range, for example in the 0.5 to 15 (wt/wt) range, such as in the 0.8 to 10 (wt/wt) range.

In some embodiments, the ratio of pure oxygen to carbon feedstock supplied to the reaction zone may be in the 0.1 to 20 (mole/mole) range, for example in the 0.25 to 15 (mole/mole) range, such as in the 0.8 to 10 (mole/mole) range.

The ammoxidation reaction can optionally be carried out the presence of a diluent, for example, a solvent that is liquid at reaction conditions. The ammoxidation reaction is exothermic. The solvent can therefore dilute the reactants, thus decreasing heat evolution per unit mass in the reaction zone. Additionally, the solvent directly transfers heat out of the reaction zone. In an embodiment, solvents having higher heat capacities are preferred. In an embodiment, solvents that do not participate in the ammoxidation reaction are preferred. Solvents having normal boiling points lower than that of adiponitrile may also be preferred. Suitable solvents can include one or more of the following shown in Table 1.

TABLE 1

| Solvent Class | Suitable Examples | Normal Boiling Point, °C. | Liquid Specific Heat, $C_p$ Cal/gm-°C. [@ 25° C.] |
|---|---|---|---|
| Solvents having normal boiling points lower than adiponitrile | Acrylonitrile | 77.3 | 0.50 |
| | Acetonitrile | 81.7 | 0.49 |
| | Dioxane | 101 | 0.41 |
| | Toluene | 110.6 | 0.40 |
| | m-xylene | 139 | 0.41 |
| | N,N-dimethylformamide | 153 | 0.48 |
| | N-Methyl-Pyrrolidone [NMP] | 204 | 0.42 |
| Solvents having normal boiling points close to adiponitrile | Cetane (Hexadecane) | 286.8 | |
| | Adiponitrile (product itself used as solvent) | 295 | 0.40 |
| | 2-Methylglutaronitrile | 274 | |
| | 2-Ethylsuccinonitrile | 264 | |

Contrary to the conventional process solvent requirement, it is observed that a suitable diluent/solvent which forms an azeotrope with water would be preferred according to this disclosure. Suitable examples of diluents forming azeotropes with water include one or more of acetonitrile, acrylonitrile, toluene, dioxane and N-methyl pyrrolidone.

In some embodiments, diluent is fed to the reactor in excess in order to reduce the temperature increase that can result from the exothermic ammoxidation reactions. A skilled person will appreciate that the recovery of diluent from the reactor effluent in a form that it can be recycled to the reactor would be economically desirable.

It will be understood that the diluent excess will depend on its heat capacity for removing the exothermic ammoxidation heat from the reaction zone. A small excess would be needed for a diluent with high heat capacity, while a large excess is needed for those with low heat capacity.

The terms, "solvent", "diluent" and "heat carrier" may be used interchangeably in the present disclosure. The feed rate of the diluent (i.e., solvent/diluent/heat carrier) is adjusted to maintain the preheated feeds in the liquid phase and to control the temperature rise across the reactor to a manageable value.

In some embodiments, the ratio of diluent to carbon feedstock supplied to the reaction zone may be in the 1 to 200 (wt/wt) range, for example in the 5 to 200 (wt/wt) range, such as in the 10 to 175 (wt/wt) range. In one embodiment, the ratio of diluent to carbon feedstock supplied to the reaction zone may be in the 20 to 60 (wt/wt) range when the diluent heat capacity is in the 0.45 to 0.55 Cal/gm °C. range. In another embodiment, the ratio of diluent to carbon feedstock supplied to the reaction zone may be in the 100 to 175 (wt/wt) range when the diluent heat capacity is in the 0.30 to 0.44 Cal/gm °C. range. An optimum diluent to carbon feed ratio range may be established that provides the necessary reaction heat management.

Catalyst

The catalyst can comprise an oxide, for example, a metal oxide. Suitable metal oxide catalysts include mixed metal oxides. The catalyst can be in the form of a slurry. Suitable catalysts include those made from the transition metals, precious metals and mixed metal oxides of such. Examples of suitable catalysts include those disclosed in:

CN105017070—A Method for preparing adiponitrile by catalytic conversion of 1,6-hexanediol (Dalian Institute of Chemical Physics, Chinese Academy of Sciences;

CN108530318—A Method for Making Adiponitrile (Yangzhou University); and

CN109956888—A Method of Catalytic Hexamethylene Ammoxidation from Methanol Cracking to Prepare Adiponitrile (Dalian Institute Of Chemical Physics, Chinese Academy of Sciences).

For carrying out the disclosed process in the liquid-phase, cryptomelane manganese oxides can be advantageous. Other examples of suitable catalysts include palladium supported on manganese oxide and ruthenium on manganese oxide, for example palladium- or ruthenium-promoted cryptomelane manganese oxides. For carrying out the reaction in the gas-phase, molybdate systems can be advantageous, such as those disclosed in U.S. Pat. No. 6,518,463 to Wachs et al.

The catalyst may or may not include a support material. Suitable supports can include zirconia and nickel oxide. The catalyst can be oxygen-regenerable.

The catalyst can be held in a fixed bed or can be in a flowable mixture with the reactants, as in a slurry bed reactor. The catalyst particle size can also be adjusted so that the reaction is carried out in a gas-lift type circulation reactor such as a fluidized bed reactor.

Reaction Zone

The reaction can be carried out in any suitable vessel or in a plurality of vessels connected in series or parallel. In an embodiment, the reaction zone is fully backmixed and can be carried out in a continuous stirred tank reactor (CSTR). Other non-limiting reaction systems may include flow reactors, multi-phase bubble column reactors, gas-lift type circulation reactors, liquid fluidized reactors, and such.

The operating conditions in the reaction zone may be in the 1-20 atm (abs.) pressure range. A high pressure may be needed to keep all components [except the oxidant] in the liquid phase during contacting. The reaction zone may operate in the 50 to 200° C. temperature range, such as the 20 to 150° C. temperature range. The reaction time may be in the 10 minutes to 24 hours range and can be maintained shorter or longer depending on the desired conversion, selectivity and byproduct formation.

Separation System

Depending on the nature of the catalyst employed in the ammoxidation reaction, the crude reaction zone effluent may initially be passed through a first solids/liquids separation zone for removing solids, in which the effluent is separated into a catalyst solids-rich stream and a liquid-rich product recovery stream. Suitable separation methods include gravitational separation, centrifugation and filtration. The first separation zone may be either a stand-alone unit operation [e.g.: filtration unit], externally integrated with the reactor unit operation [e.g.: circulation loop], or internally integrated with the reactor unit operation [e.g.: candle/cartridge filter units inside reactor]. In the first separation zone, solids may be removed from the reactor effluent, or in the case of internally-mounted candle/cartridge filters, solids may be retained within the reactor. The first separation zone produces a filtered reactor effluent that is substantially free of any solids and particulates. The filtered reactor effluent may contain≥0.001 wt. % to ≤1.0 wt. % solids. In embodiments, the first separation zone may operate at temperatures≥20° C. and ≤120° C., and operating pressures of ≥1 atm (abs.) and ≤20 atm (abs.).

Following optional passage through the first separation zone, the solids-free reaction effluent is next processed through a second separation zone or more preferably through a series of second separation zones to recover the desired dinitrile as well as any unreacted ammonia and other residual feedstocks. This second separation zone conveniently operates at temperatures of ≤220° C. and may comprise at least one unit selected from the group: i) flash separation, ii) partial or total condensation, iii) partial or total light-heavy phase separation, iv) partial or total decantation, and v) distillation. Table 2 below lists typical operational parameter ranges effective for the various units that may comprise the second separation zone.

pressure conditions during such separation are selected to obtain the required separation between the non-condensables and condensables.

In some embodiments, phase separation may occur between light [mostly, organic-rich]phase and heavy [mostly, aqueous-rich] phase. Formation of certain component azeotropes in the presence of free water may also lead to substantial phase separation. In such cases, partial/total phase separation followed by density-driven decantation may be suitable to separate the light organic-rich phase from the heavy aqueous-rich phase.

Distillative separation may be performed as part of the second separation zone for the recovery of excess diluent, excess ammonia and unconverted carbon material feed. Water addition is unexpectedly observed to be effective for ammonia recovery improvement. Upon removal of diluent, ammonia and unconverted carbon feed, the desired ammoxidation product, i.e., dinitrile (adiponitrile) is recovered, refined and purified.

Water Addition

Water is a byproduct of the ammoxidation reaction and must be removed during product recovery to yield a high purity dinitrile product. It has now been surprisingly and unexpectedly found that the supply of additional water (that is water additional to that generated as a by-product of the ammoxidation reaction) to at least a portion of the reaction effluent prior to or during separation of unreacted ammonia enhances the recovery of ammonia from the non-condens-

TABLE 2

| Second Separation Zone Element | Temperature (° C.) | | | Pressure Range [bar abs. or mmHg] | | | Other Parameters |
|---|---|---|---|---|---|---|---|
| | Range 1 | Range 2 | Range 3 | Range 1 | Range 2 | Range 3 | |
| Flash Separation | ≥80 to ≤130 | ≥80 to ≤120 | ≥90 to ≤120 | ≥1 to ≤15 bar abs. | ≥1 to ≤14 bar abs. | ≥1 to ≤12 bar abs. | Preferably an adiabatic operation |
| Partial or total condensation | ≥0 to ≤20 | ≥4 to ≤15 | ≥4 to ≤10 | ≥1 to ≤15 bar abs. | ≥1 to ≤14 bar abs. | ≥1 to ≤12 bar abs. | |
| Partial or total light-heavy phase separation followed by decantation | ≥10 to ≤80 | ≥10 to ≤75 | ≥15 to ≤70 | Dependent on Components that form azeotropes and/or phase separate | | | |
| Distillation | | | | | | | |
| Ammonia Recovery | ≥20 to ≤220 | ≥25 to ≤220 | ≥30 to ≤215 | ≥1 to ≤30 bar abs. | ≥1 to ≤25 bar abs. | ≥1.5 to ≤25 bar abs. | 5-20 stages* 2-10 RR[1] Feed enters in the lower half of col. |
| Diluent Recovery | 20-80 (Top) 150-<200 (base) | 20-75 (Top) 155-195 (base) | 20-70 (Top) 160-190 (base) | 20-600 mmHg (Top) 30-650 mmHg (base) | 25-550 mmHg (Top) 30-650 mmHg (base) | 25-500 mmHg (Top) 30-650 mmHg (base) | 5-15 stages* 3-10 RR[1] Feed enters in the upper half of col. |
| Unreacted Feed Recovery | 50-90 (Top) 180-220 (base) | 60-85 (Top) 185-210 (base) | 65-85 (Top) 190-210 (base) | 75-120 mmHg (Top) 85-135 mmHg (base) | 80-115 mmHg (Top) 90-130 mmHg (base) | 90-115 mmHg (Top) 95-125 mmHg (base) | 5-15 stages* 3-10 RR[1] Feed enters in the lower half of col. |
| Product Purification/ impurities removal | 75-150 (Top) 140-190 (base) | 80-145 (Top) 145-185 (base) | 85-140 (Top) 150-175 (base) | 5-20 mmHg (Top) 10-30 mmHg (base) | 5-15 mmHg (Top) 10-25 mmHg (base) | 5-10 mmHg (Top) 10-20 mmHg (base) | 15-25 stages* 12-25 RR[1] Feed enters mid-column |

*theoretical stages not including condenser/reboiler;
[1](molar) Reflux Ratio;

Flash separation and partial/total condensation may be used where separation of non-condensable components from condensable components is desired. The temperature and able gases for recycle. In embodiments, the water is added external to the ammoxidation reactor and may, for example, be added to a gaseous portion of the reaction effluent in a condenser such that unreacted ammonia is removed from the reaction effluent portion as an aqueous ammonia-containing condensate. It seems counter-intuitive to add more water when it is an impurity that must be removed from the product. Suitable water addition sites in the separation process are discussed in more detail below. Suitable water addition rates include from $\geq 0.5$ to $\leq 30$ weight of water per unit weight of unreacted ammonia, for example $\geq 1$ to $\leq 20$ weight of water per unit weight of unreacted ammonia, for example, $\geq 1.5$ to $\leq 15$ weight of water per unit weight of unreacted ammonia.

Referring now to the accompanying drawings, FIG. 1 shows a simplified block diagram of a process for producing dinitrile according to one embodiment of the present disclosure. In FIG. 1, Unit Block 11 represents an ammoxidation reaction system, Unit Block 31 represents an optional first separation zone and Unit Block 51 represents a second separation zone.

A fresh ammonia make-up stream 12, fresh $C_6$ carbon material make-up stream 13 and fresh diluent make-up stream 14 are introduced to their respective recycle loops, namely, 15, 16 and 17. The feed streams fed to Unit Block 11 are; total ammonia feed 18 that is combined ammonia make-up 12 and recycle ammonia 15, total $C_6$ carbon material feed 19 that is combined makeup 13 and recycle 16, and total diluent feed 21 that is combined diluent make-up 14 and diluent recycle 17. An oxidant stream 22 is directly fed to Unit Block 11.

Unit Block 11 includes an ammoxidation reaction zone and other peripheral equipment needed to manage the reaction material transport, and thermal as well as pressure management. Such equipment may include gas compression, liquid pressurization, pre-heating, in-line or static mixing, feed ports, valving, pressure venting, etc. The reaction zone may be provided in any suitable reactor configuration. A single-stage, multi-stage or parallel reaction zones may be provided along with distributed feed systems.

Upon undergoing ammoxidation reaction in Unit Block 11, the reactor effluent stream 23 may or may not contain solid catalyst. When solids are present, effluent stream 23 is introduced to the first separation zone 31 for solids removal. The first separation zone 31 may include conventional solids removal equipment, such as filtration, centrifugation, gravity separation, etc. The filtered effluent stream 32 exits the first separation zone 31 and feeds to the second separation zone 51. The concentrated solids stream 33 from Unit Block 31 is suitably processed for catalyst metal recovery or may be sent for proper disposal.

In an alternate arrangement, the first separation zone 31 may be internally integrated with the ammoxidation reaction zone provided in Unit Block 11. A non-limiting example of such internal first separation zone may include candle/cartridge filter units inside the ammoxidation reaction zone provided in Unit Block 11. In this arrangement, the internal candle/cartridge filters may effectively retain the solids inside the ammoxidation reaction zone, while the filtered ammoxidation reaction effluent is continuously discharged out of the ammoxidation reaction zone. A single or plurality (i.e., banks) of properly sized filter candles or cartridges may be mounted inside the ammoxidation reaction zone. Depending on the production rate and/or solids loading, individual filter or filter banks may be valved in (for filtration) or out (for in-situ back-flushing with additional diluent to free-up deposited solid cake) during continuous operation. Such modes of internal filtration operation are known in the heterogeneous catalysis industry. A fine solids removal step may follow to remove any residual solids, particulates and fines present in the once-filtered effluent.

Figure 2:
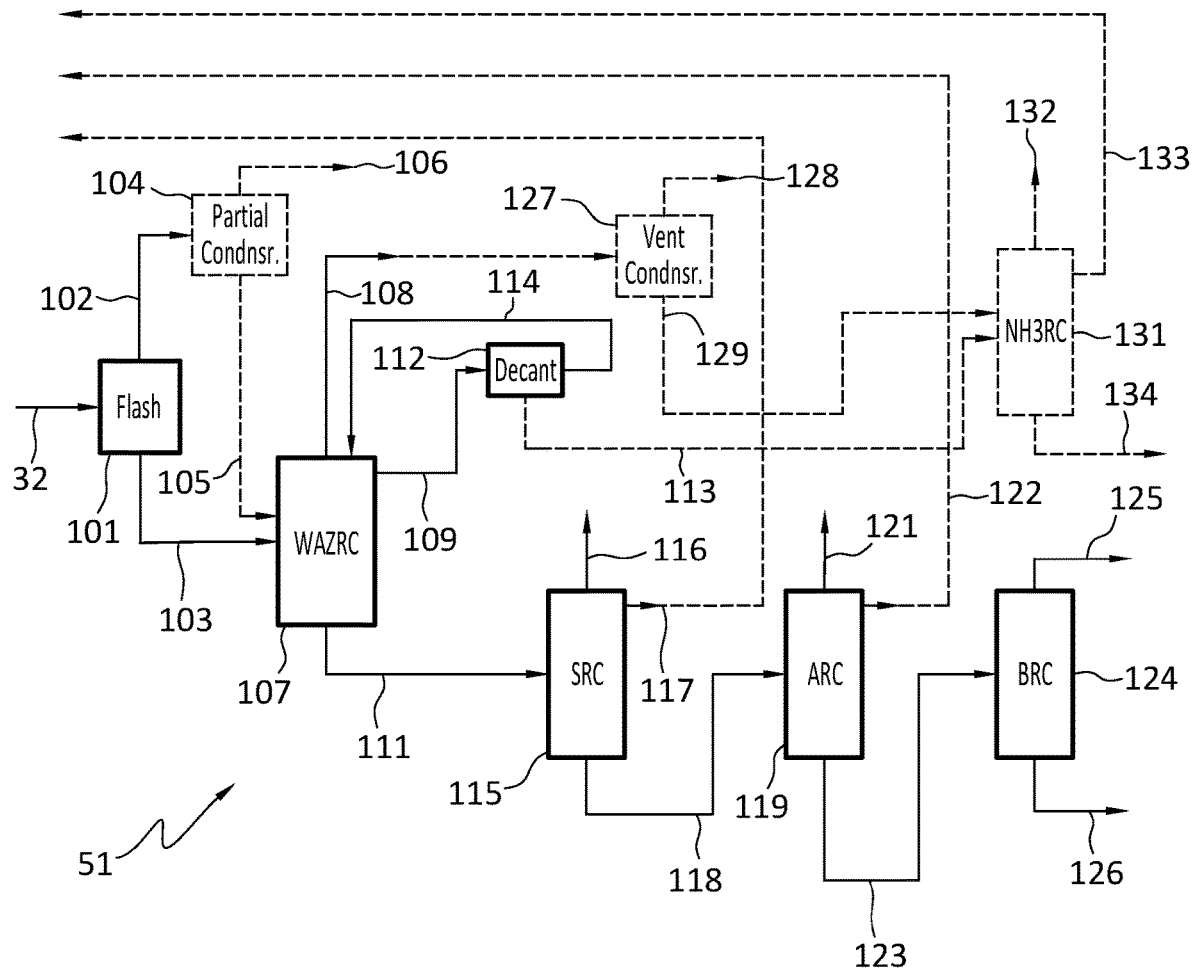
FIG. 2 is a block diagram showing the various separation units of the second separation zone 51 in accordance with a first embodiment of the process shown in FIG. 1.
Figure 3:
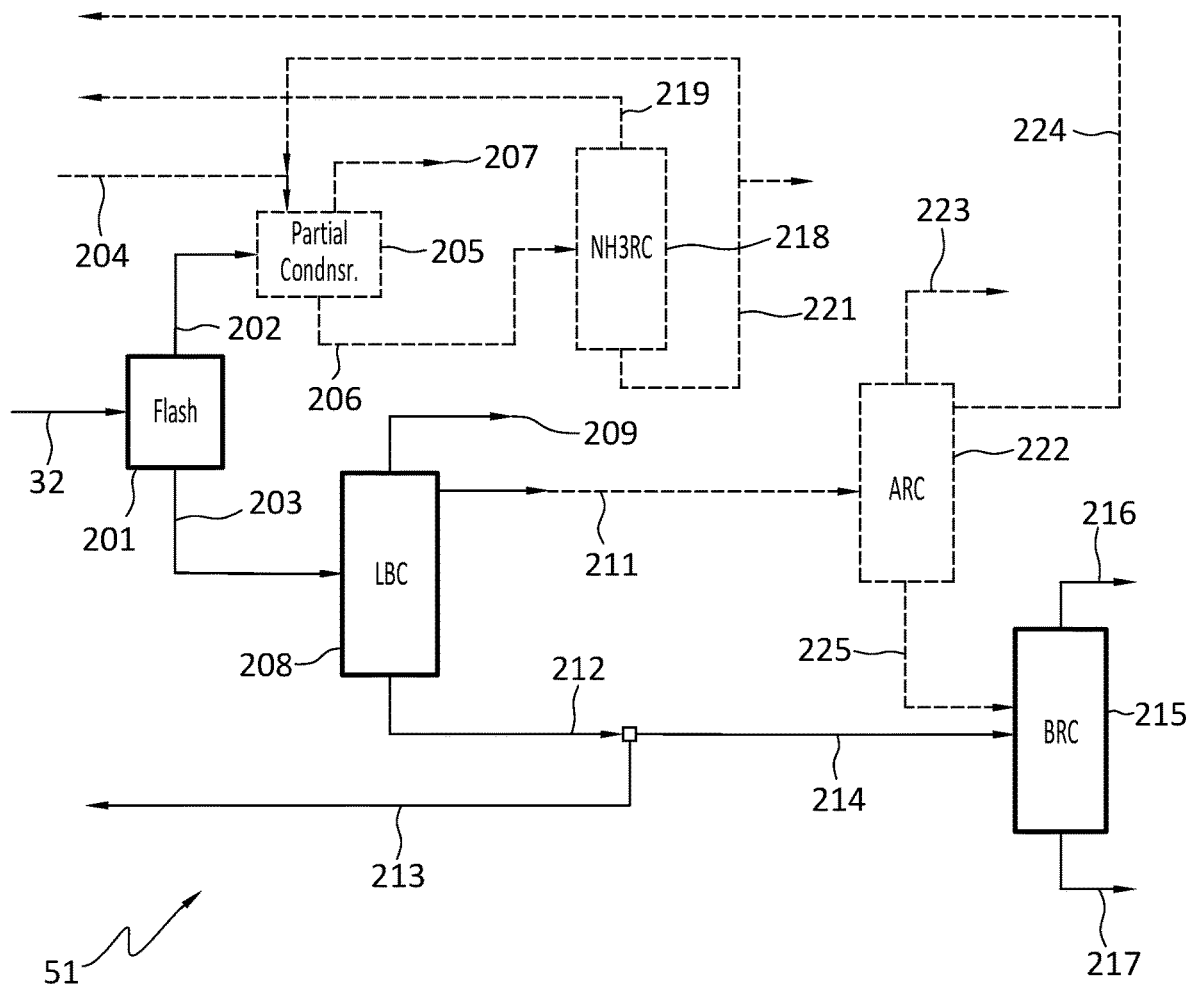
FIG. 3 is a block diagram showing the various separation units of the second separation zone 51 in accordance with a second embodiment of the process shown in FIG. 1.

Referring back to FIG. 1, the second separation zone 51 includes multiple unit operations that are designed and operated for the separation of excess diluent, excess ammonia recovery, product recovery/purification and non-condensable gas venting. Such unit operations may include, but not limited to, flash operation, partial/total condensers, phase separators, decanters, distillation columns, along with flowlines, valving, measurement and control devices, pumparounds, etc. FIGS. 2 and 3 illustrate some embodiments of the second separation zone 51.

From the second separation zone 51 are obtained recovered ammonia stream 52, unconverted $C_6$ carbon feed stream 53 and recovered excess diluent stream 54. Streams 55 and 56 represent the respective purge points for the ammonia recycle and carbon feed recycle loops in order to manage the impurity levels in corresponding recycle loops. An optional purge stream (not shown) may be taken from the recovered diluent recycle loop stream 54. A non-condensable gas vent stream 57 exits the second separation zone 51. Stream 57 is shown as a collection of gas vent streams from the various stages and units operated in the second separation zone 51. The gas vent stream 57 may be properly processed and treated downstream (not shown). Such gas vent treatment may include gas scrubbing, membrane separation, chemical treatment, flaring, etc. If the gas vent stream 57 contains combustible constituents, it may be combusted, alone or along with other combustion fuels, to both mitigate those combustible constituents and recover their combustion heat value.

The distillative separation in the second separation zone 51 is operated so that a high-purity product stream 58 is obtained. The undesirable by-products are concentrated and rejected from the unit 51 as by-product stream 59.

The overall process of FIG. 1 is operated to convert the $C_6$ carbon material feedstock stream 19 in the catalytic ammoxidation reaction zone provided in Unit Block 11 in the presence of ammonia, oxidant and diluent to yield a product stream 58 of desired purity.

FIG. 2 is a block diagram showing the various separation units of the second separation zone 51 in accordance with a first embodiment of the process shown in FIG. 1, with optional units and streams being indicated by dashed lines. The following description of the configuration and operation of the separation system shown in FIG. 2 assumes that the $C_6$ carbon feed stream to the ammoxidation process is cyclohexanol and the diluent is acrylonitrile.

As shown in FIG. 2, the filtered effluent stream 32 from the first separation zone 31 (not shown in FIG. 2) is initially passed to a flash drum 101 (e.g., adiabatic flash) which is maintained at reduced pressure (e.g., 9.5 bar abs.) (Broad range $\geq 1$ bar abs to $\leq 15$ bar abs; medium range $\geq 1$ bar abs to $\leq 14$ bar abs; narrow range $\geq 1$ bar abs to $\leq 12$ bar abs) to separate the filtered effluent stream 32 into a flash vapor stream 102 comprising non-condensables and a flash liquid stream 103. Optionally, the flash vapor stream 102 is then fed to a condenser 104 operating at sub-ambient temperature (e.g., 5° C.) (Broad range $\geq 0°$ C. to $\leq 20°$ C.; medium range $\geq 4°$ C. to $\leq 15°$ C.; narrow range $\geq 4°$ C. to $\leq 10°$ C.) to partially condense the flash vapor stream 102 to form a condenser liquid stream 105 comprising ammonia ($NH_3$), trace amounts of acrylonitrile and water; and a condenser vapor stream 106 which comprises non-condensables and is depleted in ammonia.

The flash liquid stream 103 from the flash drum 101 is fed to a first distillation column 107 with a partial condenser operating at reduced pressure (e.g., 2 bar abs.) and moderate temperature (e.g., 64° C.), to form a vapor stream 108 comprising non-condensable gases, $NH_3$, acrylonitrile, and water; a liquid distillate stream 109 comprising $NH_3$, a minor portion of acrylonitrile, and water (as an acrylonitrile-water azeotrope); and a bottoms stream 111 comprising the adiponitrile product, a major portion of the acrylonitrile diluent, cyclohexanol, amide and nitrile byproducts {(hexanenitrile (HN), hexanamide (HAM), succinonitrile (SN), and glutaronitrile (GN)}.

The liquid distillate stream 109 from the first distillation column 107 is fed to an overhead decanter 112 operating at a reduced temperature (e.g., 20° C.) (Broad range ≥10° C. to ≤80° C.; medium range ≥10° C. to ≤75° C.; narrow range ≥15° C. to ≤70° C.) to form an organic phase comprising acrylonitrile and an aqueous phase comprising water, $NH_3$ and acrylonitrile. The aqueous phase is withdrawn from the decanter 112 as an aqueous liquid distillate stream 113 for optional further processing as described below, and the organic phase stream 114 is returned to the distillation column 107 as reflux.

The bottoms stream 111 comprising adiponitrile, a major portion of acrylonitrile, cyclohexanol, and amide and nitrile byproducts is fed to a second distillation column 115 with a partial condenser operating under vacuum (e.g., 450 mmHg) (Broad range ≥20 mmHg to ≤600 mmHg; medium range ≥25 mmHg to ≤550 mmHg; narrow range ≥25 mmHg to ≤500 mmHg) and moderate temperature (e.g., 62° C.), (Broad range ≥20° C. to ≤80° C.; medium range ≥20° C. to ≤75° C.; narrow range ≥20° C. to ≤70° C.) to form a condenser vapor stream 116 comprising a minor portion of the acrylonitrile and a minor amount of water; a liquid distillate stream 117 comprising a major portion of the acrylonitrile; and a bottoms stream 118 depleted in acrylonitrile and comprising adiponitrile, cyclohexanol, and amide and nitrile byproducts.

The bottoms stream 118 from the second distillation column 115 is fed a third distillation column 119 with a partial condenser operating under higher vacuum than column 115 (e.g., 100 mmHg) (Broad range ≥75 mmHg to ≤120 mmHg; medium range ≥80 mmHg to ≤115 mmHg; narrow range ≥90 mmHg to ≤115 mmHg) and a bottoms temperature of about 200° C. or lower (e.g., 199° C.) (Broad range ≥180° C. to ≤220° C.; medium range ≥185° C. to ≤210° C.; narrow range ≥190° C. to ≤210° C.) to form a vapor stream 121 comprising acrylonitrile, cyclohexanol, and hexanenitrile; a liquid distillate stream 122 comprising cyclohexanol and hexanenitrile; and a bottoms stream 123 reduced in cyclohexanol and comprising dinitrile product and amide and nitrile byproducts (HAM, SN, and GN).

The bottoms stream 123 from the third distillation column 119 is fed to a fourth distillation column 124 operating under higher vacuum than column 119 (e.g., 10 mmHg) (Broad range ≥5 mmHg to ≤20 mmHg; medium range ≥5 mmHg to ≤15 mmHg; narrow range ≥5 mmHg to ≤10 mmHg) and bottoms temperature of 200° C. or lower (e.g., 162° C.) (Broad range ≥140° C. to ≤190° C.; medium range ≥145° C. to ≤185° C.; narrow range ≥150° C. to ≤175° C.) to form a liquid distillate stream 125 comprising amide and nitrile byproducts (HAM, SN, and GN); and a bottoms stream 126 comprising adiponitrile.

Optionally, the condenser vapor stream 108 from the distillation column 107 is partially condensed at sub-ambient temperature (e.g., 5° C.) in a vent partial condenser 127 to form a vent condenser vapor stream 128 comprising non-condensables, $NH_3$, and acrylonitrile; and a vent condenser liquid stream 129 comprising $NH_3$, acrylonitrile, and water.

Optionally, the partial condenser liquid stream 105 comprising ammonia ($NH_3$), acrylonitrile, and water is fed to the distillation column 107 to recover $NH_3$ and acrylonitrile.

Optionally, the aqueous distillate stream 113 comprising $NH_3$, acrylonitrile, and water from the decanter 112 and the vent condenser liquid stream 129 comprising $NH_3$, acrylonitrile, and water from the condenser 127 are fed to a further distillation column 131 with a partial condenser operating at elevated pressure (e.g., 19 bar abs. condenser pressure) (Broad range ≥1 bar abs to ≤30 bar abs; medium range ≥1 bar abs to ≤25 bar abs; narrow range ≥1.5 bar abs to ≤25 bar abs) to form a vapor stream 132 comprising non-condensable gases and $NH_3$; a liquid distillate stream 133 comprising $NH_3$ and acrylonitrile; and a bottoms stream 134 comprising acrylonitrile and water. In such an embodiment, the liquid distillate stream 133 is conveniently recycled to the ammoxidation reaction zone, such as that provided in Unit Block 11 of FIG. 1.

Optionally, the liquid distillate stream 117 comprising a major portion of the acrylonitrile in the filtered effluent stream 32 is recycled to the ammoxidation reaction zone, such as that provided in Unit Block 11 of FIG. 1.

Optionally, the liquid distillate stream 122 comprising cyclohexanol is recycled from the distillation column 119 to the ammoxidation reaction zone, such as that provided in Unit Block 11 of FIG. 1, to reduce the amount of make-up cyclohexanol required.

It is to be understood that the liquid distillate streams 117, 122 and 133 that are being recycled to the ammoxidation reaction zone, such as that provided in Unit Block 11 of FIG. 1, may undergo further refinement and purification steps (not shown in FIG. 1 or FIG. 2) for impurity control.

Although not shown in FIG. 2, excess ammonia recovery is further enhanced in the second separation zone 51 by adding water:
  i) with the flash vapor stream 102 from flash drum 101 feeding the partial condenser 104, or
  ii) with the condenser vapor stream 108 from the distillation column 107 feeding the vent condenser 127, or
  iii) a combination of i) and ii).

In one embodiment (not shown in FIG. 2), the bottoms stream 134 from the distillation column 131 comprises mostly water and residual acrylonitrile and may be available as a recycle water stream for the above-mentioned water additions to the condenser 104 and/or the condenser 127. It will be understood that such water recycle may have fresh make-up and purge point for keeping trace impurity levels from building up in the recycle loop.

FIG. 3 is a block diagram showing the various separation units of the second separation zone 51 in accordance with a second embodiment of the process shown in FIG. 1, with optional units and streams being indicated by dashed lines. The following description of the configuration and operation of the separation system shown in FIG. 3 assumes that the $C_6$ carbon feed stream to the ammoxidation process is cyclohexanol and the diluent is a portion of the adiponitrile product.

As shown in FIG. 3, the filtered effluent stream 32 from the first separation zone (not shown in FIG. 3) is initially passed to a flash drum 201 (e.g., adiabatic flash) which is maintained at reduced pressure (e.g., 2 bar abs.) (Broad range ≥1 bar abs to ≤15 bar abs; medium range ≥1 bar abs to ≤14 bar abs; narrow range ≥1 bar abs to ≤12 bar abs) to separate the filtered effluent stream 32 into a flash vapor stream 202 comprising non-condensables, including ammonia, and a flash liquid stream 203.

The flash vapor stream 202 and an added water stream 204 are fed to a condenser 205 operating at sub-ambient temperature (e.g., 5° C.) (Broad range ≥0° C. to ≤20° C.; medium range ≥4° C. to ≤15° C.; narrow range ≥4° C. to ≤10° C.) such that the mixed stream is partially condensed to form a condenser liquid stream 206 comprising ammonia ($NH_3$) and water, and a partial condenser vapor stream 207 which comprises non-condensables and is partly depleted in ammonia.

The flash liquid stream 203 from the flash drum 201 is fed to a first distillation column 208 with a partial condenser operating under vacuum (e.g., 30 mmHg) (Broad range ≥20 mmHg to ≤600 mmHg; medium range ≥25 mmHg to ≤550 mmHg; narrow range ≥25 mmHg to ≤500 mmHg) to form a vapor stream 209 comprising $NH_3$ and water, a liquid distillate stream 211 comprising cyclohexanol (A) and hexanenitrile (HN), and a bottoms stream 212 comprising ADN (and HAM, SN, and GN).

A portion of the bottoms stream 212, i.e., recycle ADN stream 213, comprising ADN is recycled to the ammoxidation reaction zone, such as that provided in Unit Block 11 of FIG. 1, as diluent, while the remaining portion, i.e., crude ADN stream 214, is fed to a second distillation column 215 operating under vacuum (e.g., 10 mmHg) to form a distillate stream 216 comprising amide and nitrile byproducts (HAM, SN, GN) and a minor portion of ADN, and a bottoms stream 217 that is refined ADN product that comprises a minor portion of nitrile byproducts.

Optionally, the condenser liquid stream 206 comprising ammonia ($NH_3$) and water is fed to a third distillation column 218 operating at elevated pressure (e.g., 19 bar abs. condenser pressure) to form a liquid distillate stream 219 comprising $NH_3$, and a bottoms stream 221 comprising water. The liquid distillate stream 219 comprising $NH_3$ can be recycled to the ammoxidation reaction zone, such as that provided in Unit Block 11 of FIG. 1, while the bottoms stream 221 comprising water can be fed to the condenser 205.

Optionally, liquid distillate stream 211 comprising cyclohexanol (A) and hexanenitrile (HN) from the first distillation column 208 can be fed to a fourth distillation column 222 operating under vacuum (e.g., 100 mmHg) with partial condenser to form a vapor stream 223 comprising water and a minor amount of cyclohexanol (A), a liquid distillate stream 224 comprising cyclohexanol (A), and a bottoms stream 225 comprising ADN and byproduct amides and nitriles (HAM, SN, GN).

Optionally, the liquid distillate stream 224 comprising cyclohexanol (A) from the distillation column 222 can be recycled to the ammoxidation reaction zone, such as that provided in Unit Block 11 of FIG. 1, to reduce the amount of make-up cyclohexanol feed.

Optionally, the bottoms stream 225 comprising ADN and byproduct amides and nitriles (HAM, SN, GN) from the fourth distillation column 222 can be fed to the second distillation column 215 to recover the ADN therein.

It is to be understood that the liquid distillate streams 219, 224 and recycle ADN stream 213 that are being recycled to the ammoxidation reaction zone, such as that provided in Unit Block 11 of FIG. 1, may undergo further refinement and purification steps (not shown in FIG. 1 or FIG. 3) for impurity control.

The invention will now be more particularly described with reference to the following non-limiting Examples.

In FIGS. 2 and 3,
WAZRC—water azeotrope recovery column;
SRC—solvent recovery column;
ARC—"A" (cyclohexanol) recovery column;
BRC—byproduct recovery column;
NH3RC—ammonia recovery column; and
LBC—low boiler column.

Comparative Example 1 (Ammoxidation)

Cyclohexanol (100 parts by weight per hour) and toluene (10,000 parts by weight per hour) are charged to a slurry CSTR reactor together with 170 parts by weight per hour of ammonia and 160 parts by weight per hour of oxygen (as air). The CSTR reactor contains an equivalent metal oxide catalyst published in CN109956888A. Process conditions are controlled at 100° C. and 10 atm pressure (absolute) at the gas feed inlet of the CSTR. The mixing energy input provides substantially uniform composition across the CSTR. After one hour, the reactor effluent is sampled. Across the reactor, 80% molar conversion of cyclohexanol is observed with 85% molar selectivity to adiponitrile. Side products of the reaction are divided approximately equally among glutaronitrile, succinonitrile, hexanenitrile and hexanamide.

Comparative Example 2 (Product Recovery and Separation)

The crude reaction product from Comparative Example 1 is refined in the following sequential steps.
Cooling reaction effluent to room temp—upon de-pressurizing and de-gassing the reactor contents for any residual ammonia and oxygen [air] with $N_2$, the reactor effluent is gradually cooled to about 20-25° C. under the inert ($N_2$) blanket. The cooled effluent is collected in an inerted container.
Filtration (or centrifugation) to remove catalyst solids—an appropriately sized filtration element is used through which the above cooled effluent is blow-cased at a steady flowrate. The filtered catalyst solids are retained for post-characterization.
Rotary evaporation to remove solvent phase—Batch rotary evaporation is performed at ≤100° C. and 200-600 mmHg vacuum to remove excess solvent, toluene in this example, while keeping the remaining material gently stirred to prevent any thermal degradation.
Water addition to the material remaining after rotary evaporation—Once the solvent is removed, about 100-500 parts by weight per hour water is added to the material and stirred under $N_2$. Water addition serves the purpose of providing i) some working effluent volume upon removing all excess solvent, ii) to minimize product thermal degradation from overheating and iii) to aid during distillative separation that follows.
Solvent extraction for dinitriles—The above material undergoes distillative separation to remove the low-boiling constituents along with water overhead while leaving crude dinitrile product in the base.
Vacuum separation for ADN—The above crude dinitrile product undergoes a series of distillation steps to separate out undesirable impurities while purifying the dinitrile product.

Depending on the above steps and distillation conditions [temperature, vacuum, time], the dinitrile product yield is low and typically between 45-65%.

Examples 1A and 2A (Ammoxidation)

Cyclohexanol, excess ammonia ($NH_3$), excess air, and a diluent (acrylonitrile in Example 1A and adiponitrile product in Example 2A) are preheated to 100° C. and fed to a continuous reaction zone in Unit Block 11 (FIG. 1)] operating at 10 bar absolute pressure. The feed rate of the diluent is adjusted to maintain the preheated cyclohexanol, ammonia, and diluent in the liquid phase and to maintain the temperature rise across the reaction zone at 20° C. or less. The feed rates, reactor conditions, and resulting reactor effluent composition are shown in Table 3 below:

TABLE 3

| Example | 1A | 2A |
|---|---|---|
| Solvent Class | Solvent having normal boiling point lower than adiponitrile | Product itself used as a solvent |
| Hydrocarbon Reactant | Cyclohexanol | Cyclohexanol |
| Diluent/Solvent | Acrylonitrile | Adiponitrile |
| Diluent/Solvent Features | low-boiling relative to water | high-boiling relative to water; diluent is the product |
| Reactor Total* Feed Rates: | | |
| Cyclohexanol, kg/hr | 100 | 100 |
| Ammonia, kg/hr | 170 | 170 |
| Air, kg/hr | 687 | 687 |
| Diluent, kg/hr | 4,709 | 14,203** |
| Feed Preheater Duty ***, MJ/hr | 983 | 173 |
| Air Compression: | | |
| Stages (equal pressure ratios) | 3 | 3 |
| Discharge Pressure, bar(a) | 10.2 | 10.2 |
| Stage after-cooler exit temperatures, ° C. | 80, 100, 100 | 80, 100, 100 |
| Total work (100% efficiency), kW | 76 | 76 |
| Total cooling duty, MJ/hr | −219 | −217 |
| Reactor Inlet Temperature, ° C. | 100 | 100 |
| Reactor Outlet Temperature, ° C. | 116 | 120 |
| Reactor Outlet Pressure, bar (abs.) | 10.0 | 10.0 |
| Cyclohexanol Conversion, % (molar) | 80% | 80% |
| Reactor Effluent Composition, wt. % [free of solids] | | |
| Nitrogen | 9.30 | 3.47 |
| Oxygen | 1.90 | 0.71 |
| Carbon Dioxide | 0.07 | 0.03 |
| Ammonia | 2.54 | 0.95 |
| Acrylonitrile [ACRN] | 83.11 | — |
| Water | 1.23 | 0.46 |
| Cyclohexanol [A] | 0.35 | 0.13 |
| Hexanenitrile [HN] | 0.05 | 0.02 |
| Hexanamide [HAM] | 0.06 | 3.20 |
| Succinonitrile [SN] | 0.04 | 2.20 |
| Glutaronitrile [GN] | 0.05 | 2.83 |
| Adiponitrile [ADN] | 1.30 | 86.00 |

*Total Feed is fresh make-up + Recycle combined;

**No fresh diluent Make-up added

*** Preheats cyclohexanol + ammonia + diluent feeds; Air compression and feed preheating are not shown in FIGS.

In Example 2A that uses adiponitrile product itself as diluent, there is no need for a fresh diluent make-up [represented as stream 14 in FIG. 1] and the feed rate shown in Table 3 is the total recycle diluent [represented as stream 17 in FIG. 1]. The overall process of Example 2A is a net generator of adiponitrile, and therefore, no additional make-up of adiponitrile as diluent would be necessary. It will be understood that fresh diluent make-up may be required in all cases that use diluent other than the product itself, such as in Example 1A. It is also understood that in all cases where diluent is recycled, even in the case where the diluent is adiponitrile, fresh diluent make-up is initially required for a period of time in order to establish sufficient diluent recycle flow rate for steady-state operation.

Example 1B—Recovery of Adinonitrile Product from Filtered Effluent of Example 1A In Example 11B, the solids-free reactor effluent composition of Example 1A, and as shown in Table 3, is processed in the second separation zone 51 shown in FIG. 2. Table 4 below details the temperature, pressure, total mass flow rate and composition of the various streams shown in FIG. 2 and as employed in Example 1B, whereas Table 5 summarizes the operating conditions of the various units shown in FIG. 2 as employed in Example 1B.

TABLE 4

| Stream | 32 | 102 | 103 | 105 | 106 | 108 | 111 | 113 | 116 | 117 |
|---|---|---|---|---|---|---|---|---|---|---|
| Temperature, °C. | 116.0 | 114.9 | 114.9 | 5.0 | 5.0 | 63.9 | 115.7 | 20.0 | 61.8 | 61.8 |
| Pressure, bar(a) | 10.0 | 9.5 | 9.5 | 9.3 | 9.3 | 2.0 | 3.0 | 2.0 | 0.600 | 0.600 |
| Total Mass Flow, kg/hr | 5,666.0 | 1,424.8 | 4,241.1 | 755.4 | 669.4 | 222.3 | 4,644.3 | 130.0 | 226.9 | 4,310.6 |
| Mass Fractions | | | | | | | | | | |
| $N_2 + O_2 + CO_2$ | 0.113 | 0.443 | 0.002 | 0.008 | 0.933 | 0.061 | | 63 ppmw | | |
| NH3 | 0.025 | 0.080 | 0.007 | 0.098 | 0.060 | 0.383 | | 0.147 | | |
| ACRN | 0.831 | 0.461 | 0.955 | 0.863 | 0.008 | 0.502 | 0.977 | 0.419 | 0.999 | 1.000 |
| WATER | 0.012 | 0.016 | 0.011 | 0.030 | 56 ppmw | 0.054 | 277 ppmw | 0.434 | 726 ppmw | 261 ppmw |
| A | 0.004 | 151 ppmw | 0.005 | 285 ppmw | | | 0.004 | | | |
| HN + HAM + SN + GN | 0.002 | 0 ppmw | 0.003 | 1 ppmw | | | 0.002 | | | |
| ADN | 0.013 | 5 ppmw | 0.017 | 9 ppmw | | | 0.016 | | | |

| Stream | 118 | 121 | 122 | 123 | 125 | 126 | 128 | 129 | 132 | 133 | 134 |
|---|---|---|---|---|---|---|---|---|---|---|---|
| Temperature, °C. | 171.7 | 77.9 | 77.9 | 199.2 | 89.6 | 162.4 | −5.0 | −5.0 | 47.4 | 47.4 | 183.5 |
| Pressure, bar(a) | 0.667 | 0.133 | 0.133 | 0.160 | 0.013 | 0.019 | 1.8 | 1.8 | 19.0 | 19.0 | 20.0 |
| Total Mass Flow, kg/hr | 106.8 | 1.1 | 21.3 | 84.4 | 11.8 | 72.6 | 48.7 | 173.5 | 1.4 | 69.9 | 232.2 |
| Mass Fractions | | | | | | | | | | | |
| $N_2 + O_2 + CO_2$ | | | | | | | 0.274 | 492 ppmw | 0.038 | 0.002 | |
| $NH_3$ | | | | | | | 0.706 | 0.293 | 0.961 | 0.945 | 0.011 |
| ACRN | | 0.017 | 0.609 | 0.053 | | | 0.020 | 0.637 | 991 ppmw | 0.053 | 0.695 |
| WATER | | | 2 ppmw | | | | 66 ppmw | 0.069 | | 804 ppmw | 0.295 |
| A | | 0.187 | 0.312 | 0.823 | 0.025 | 0.178 | | | | | |
| HN + HAM + SN + GN | | 0.108 | 0.079 | 0.124 | 0.105 | 0.742 | 0.001 | | | | |
| ADN | | 0.687 | | | 0.870 | 0.079 | 0.999 | | | | |

$N_2$ is nitrogen, $O_2$ is oxygen, $CO_2$ is carbon dioxide, $NH_3$ is ammonia, ACRN is acrylonitrile, A is cyclohexanol, HN is hexanenitrile, HAM is hexanamide, SN is succinonitrile, GN is glutaronitrile, ADN is adiponitrile, bar(a) is bar absolute, ppmw is parts per million by weight.

TABLE 5

| Unit operation | Flash Drum 101 | Partial Condenser 104 | Column 107 | Column 115 | Column 119 | Column 124 | Vent Condenser 127 | Column 131 |
|---|---|---|---|---|---|---|---|---|
| Outlet pressure, bar(a) | 9.5 | 9.3 | — | — | — | — | 1.8 | — |
| Outlet temperature, °C. | dictated by adiabatic | 5 | — | — | — | — | −5 | — |
| Duty, MJ/hr (negative denotes cooling) | 0 | −795 | — | — | — | — | −205 | — |
| Number of theoretical stages (NOT including condenser or reboiler) | — | — | 8 | 8 | 5 | 18 | — | 9 |
| Feed stage (1 = top of column) | — | — | 4.4 | 4 | 4 | 12 | — | 5 |
| Condenser pressure, bar(a) | — | — | 2.0 | 0.600 | 0.133 | 0.013 | — | 19.0 |
| Molar reflux ratio | — | — | 5 | 5 | 5 | 20 | — | 3 |
| Mass ratio of distillate to feed | — | — | 0.0705 | 0.977 | 0.21 | 0.14 | — | 0.235 |

TABLE 5-continued

| Unit operation | Flash Drum 101 | Partial Condenser 104 | Column 107 | Column 115 | Column 119 | Column 124 | Vent Condenser 127 | Column 131 |
|---|---|---|---|---|---|---|---|---|
| Top temperature, °C. | — | — | 64 | 62 | 78 | 90 | — | 47 |
| Bottom temperature, °C. | — | — | 116 | 172 | 199 | 162 | — | 183 |
| Condenser duty, MJ/hr | — | — | −2,530 | −16,600 | −81 | −182 | — | −311 |
| Reboiler duty, MJ/hr | — | — | 3,278 | 16,148 | 80 | 173 | — | 503 |
| Decanter temperature, °C. | — | — | 20 | — | — | — | — | — |

In Example 1B, recovery of adiponitrile product from the reactor effluent is 98.7% and adiponitrile product purity is 99.9 wt. %. Recovery of acrylonitrile diluent from the reactor effluent is 91.5% and the recovered acrylonitrile has a purity of 99.97 wt. %. Recovery of unreacted ammonia ($NH_3$) from the reactor effluent is 45.8% and its purity is 94.5 wt. % ammonia. Recovery of unreacted cyclohexanol from the reactor effluent is 87.7% and its purity is 82.3 wt. % cyclohexanol.

Example 2B—Recovery of Adiponitrile Product from Filtered Effluent of Example 2A The solids-free reactor effluent composition of Example 2A, as summarized in Table 3, is processed in the second separation zone 51 shown in FIG. 3. Table 6 below details the temperature, pressure, total mass flow rate and composition of the various streams shown in FIG. 3 as employed in Example 2B, whereas Table 7 summarizes the operating conditions of the various units shown in FIG. 3 as employed in Example 2B.

TABLE 6

| Stream | 32 | 202 | 203 | 204 | 206 | 207 | 209 | 211 | 212 | 213 |
|---|---|---|---|---|---|---|---|---|---|---|
| Temperature, °C. | 120.0 | 119.7 | 119.7 | 20.0 | 5.0 | 5.0 | 25.0 | 25.0 | 187.3 | 100.0 |
| Pressure, bar(a) | 10.0 | 2.0 | 2.0 | 10.0 | 1.8 | 1.8 | 0.040 | 0.040 | 0.053 | 2.5 |
| Total Mass Flow, kg/hr | 15,160.5 | 761.5 | 14,398.8 | 400.0 | 505.4 | 656.1 | 100.5 | 25.4 | 14,272.9 | 14,202.9 |
| Mass Fractions: | | | | | | | | | | |
| $N_2 + O_2 + CO_2$ | 0.042 | 0.833 | 7 ppmw | | 0.002 | 0.965 | 0.035 | | | |
| $NH_3$ | 0.010 | 0.150 | 0.002 | | 0.183 | 0.033 | 0.300 | 0.001 | | |
| WATER | 0.005 | 0.011 | 0.004 | 1.000 | 0.805 | 0.002 | 0.596 | 0.065 | | |
| A | 0.001 | 679 ppmw | 0.001 | | 0.001 | 1 ppmw | 0.054 | 0.552 | | |
| HN + HAM + SN + GN | 0.083 | 0.001 | 0.087 | | 0.002 | | 0.014 | 0.125 | 0.087 | 0.087 |
| ADN | 0.860 | 0.005 | 0.905 | | 0.007 | | 106 ppmw | 0.256 | 0.913 | 0.913 |

| Stream | 214 | 216 | 217 | 219 | 221 | 223 | 224 | 225 |
|---|---|---|---|---|---|---|---|---|
| Temperature, °C. | 100.0 | 132.6 | 162.4 | 37.4 | 211.2 | 71.2 | 71.2 | 208.1 |
| Pressure, bar(a) | 2.5 | 0.013 | 0.019 | 19.0 | 20.0 | 0.133 | 0.133 | 0.160 |
| Total Mass Flow, kg/hr | 69.9 | 8.9 | 69.4 | 90.1 | 414.4 | 3.1 | 14.0 | 8.4 |
| Mass Fractions: | | | | | | | | |
| $N_2 + O_2 + CO_2$ | | | | 0.009 | | 2 ppmw | | |
| $NH_3$ | | | | 0.953 | 0.015 | 0.009 | 18 ppmw | |
| WATER | | | | 0.035 | 0.974 | 0.457 | 0.019 | |
| A | | 0.009 | | 0.003 | 521 ppmw | 0.465 | 0.897 | 0.010 |
| HN + HAM + SN + GN | 0.087 | 0.872 | 0.002 | | 0.002 | 0.069 | 0.084 | 0.215 |
| ADN | 0.913 | 0.118 | 0.998 | | 0.009 | | | 0.775 |

$N_2$ is nitrogen, $O_2$ is oxygen, $CO_2$ is carbon dioxide, A is cyclohexanol, $NH_3$ is ammonia, HN is hexanenitrile, HAM is hexanamide, SN is succinonitrile, GN is glutaronitrile, ADN is adiponitrile, bar(a) is bar absolute, ppmw is parts per million by weight

TABLE 7

| Unit operation | Flash drum 201 | Partial Condenser 205 | Column 208 | Bottoms Cooler * | Column 215 | Column 218 | Column 222 |
|---|---|---|---|---|---|---|---|
| Outlet pressure, bar(a) | 2.0 | 1.8 | — | 2.5 | — | — | — |
| Outlet temperature, ° C. | dictated by adiabatic | 5 | — | 100 | — | — | — |
| Duty, MJ/hr (negative denotes cooling) | 0 | −467 | — | −2,582 | — | — | — |
| Number of theoretical stages (NOT including condenser or reboiler) | — | — | 8 | — | 18 | 9 | 6 |
| Feed stage (1 = top of column) | — | — | 1 | — | 5 (stream 225), 12 (Crude ADN 214) | 6 | 3 |
| Condenser pressure, bar(a) | — | — | 0.039 | — | 0.013 | 18.8 | 0.132 |
| Molar reflux ratio | — | — | 5 | — | 20 | 2 | 7 |
| Mass ratio of distillate to feed | — | — | 0.00875 | — | 0.1 | 0.18 | 0.67 |
| Top temperature, ° C. | — | — | 25 | — | 133 | 37 | 71 |
| Bottom temperature, ° C. | — | — | 187 | — | 162 | 211 | 208 |
| Condenser duty, MJ/hr | — | — | −2,051 | — | −125 | −357 | −112 |
| Reboiler duty, MJ/hr | — | — | 4,090 | — | 133 | 996 | 121 |

* Not shown in FIG. 3. Cools bottoms stream 212 [Table 6] to about 100° C. before it is split into ADN recycle stream 213 and crude ADN stream 214.

In Example 21B, recovery of adiponitrile from the reactor effluent is 99.9600 and is sufficient to recycle the required flow rate of ADN diluent and produce a product ADN with purity of 99.8 wt. % adiponitrile and flowrate that is 93.500 of the net ADN produced in the reactor. Recovery of unreacted ammonia ($NH_3$) from the reactor effluent is 59.6% and its purity is 95.3 wt. % ammonia. Recovery of unreacted cyclohexanol from the reactor effluent is 62.7% and its purity is 89.7 wt. % cyclohexanol.

Comparative Example 3—No Water Addition to the Second Separation Zone

The second separation zone [represented as 51 in FIG. 1] is operated in a similar manner to that in Example 2B3 and Tables 6 and 7 except the water addition stream 204 is absent. In doing so, the excess ammonia recovery in the second separation zone 51 is lower than that obtained in Example 2B3.

In Comparative Example 3, the partial condenser 205 is operated at the same conditions, 1.8 bar abs. pressure and 5° C. temperature, as in Example 2B3 but without any water addition (i.e., water addition stream 204 is absent). Only about 300 of the ammonia in the incoming flash vapor stream 202 is recovered in the condenser liquid stream 206.

In contrast, in Example 2B, the water addition stream 204 has a mass flow rate of 400 kg/hr and about 81% of the ammonia in the incoming flash vapor stream 202 is recovered in the condenser liquid stream 206. Table 8 provides a summary.

TABLE 8

| Example ID | Comparative 3 | 2B |
|---|---|---|
| Mass flow of Water addition stream 204 (FIG. 3), kg/hr | 0 | 400 |
| Water addition [stream 204] per unit of unreacted ammonia in Stream 202 (wt/wt) | 0 | 3.5 |

TABLE 8-continued

| Example ID | Comparative 3 | 2B |
|---|---|---|
| NH3 Recovery in Partial Condenser (Stream 206/Stream 202 in FIG. 3), % | 3% | 81% |

Examples 4A and 5A (Ammoxidation)

Similar to Examples 1A and 2A ammoxidation steps, cyclohexanol, excess ammonia ($NH_3$), excess air, and a diluent (acrylonitrile in Example 4A and adiponitrile product in Example 5A) are preheated to 100° C. and fed to a continuous reaction zone in Unit Block 11 (FIG. 1)] operating at 10 bar absolute pressure. The feed rate of the diluent is adjusted to maintain the preheated cyclohexanol, ammonia, and diluent in the liquid phase and to maintain the temperature rise across the reaction zone at 20° C. or less. The cyclohexanol per-pass molar conversion is about 60% and the molar selectivity to adiponitrile product is about 80%.

Examples 4B and 5B—Recovery of Adiponitrile Product from Filtered Effluent of Example 4A and 5A Similar to the distillative schemes described and operated for Examples 1B and 2B and shown in their corresponding FIGS. 2 and 3, the solids-free reactor effluent of Examples 4A and 5A are processed in the second separation zone 51. The excess ammonia, unconverted $C_6$ feed and recovered diluent are recycled back the ammoxidation reaction step as shown in FIG. 1. It is observed that the excess ammonia recovery improves with the water addition in the second separation zone 51 [FIG. 1] and as described above.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for producing dinitrile comprising:
   (a) supplying a $C_6$ organic compound, an oxidizing agent, ammonia and a diluent to a reaction zone to produce a reaction mixture;
   (b) contacting the reaction mixture in the reaction zone with a heterogeneous catalyst at a temperature from 50 to 200° C. to convert at least a portion of the $C_6$ organic compound to dinitrile and water and produce a reaction effluent; and
   (c) supplying at least part of the reaction effluent to a separation system to separate at least (i) dinitrile and (ii) unreacted ammonia from the reaction effluent, wherein additional water is supplied to a portion of the reaction effluent prior to or during separation of unreacted ammonia in (c) (ii).

2. The process of claim 1, wherein the $C_6$ organic compound is selected from the group consisting of cyclohexane, cyclohexene, cyclohexadiene, hexanediol, cyclohexanol, cyclohexanone, benzene, caprolactam, hydroxycaproic acid and mixtures thereof.

3. The process of claim 1, wherein the diluent forms an azeotrope with water.

4. The process of claim 1, wherein the diluent has a normal boiling point below that of the dinitrile.

5. The process of claim 1, wherein the diluent comprises one or more of acrylonitrile, acetonitrile, toluene, dioxane, m-xylene, N,N-dimethylformamide and N-methyl pyrrolidone.

6. The process of claim 1, wherein the diluent comprises adiponitrile or 2-methylglutaronitrile.

7. The process of claim 1, wherein the oxidizing agent comprises at least one of oxygen, a nitrogen oxide, hydrogen peroxide, cyclohexyl-hydroperoxide[CHHP] and cumene hydroperoxide.

8. The process of claim 1, wherein the oxidizing agent comprises oxygen.

9. The process of claim 1, wherein the catalyst comprises at least one metal oxide.

10. The process of claim 1, wherein the catalyst is in the form of at least one of a slurry bed or a fixed bed.

11. The process of claim 1, wherein said portion of the reaction effluent is removed from the reaction zone before the supply of the additional water.

12. The process of claim 1 and further comprising:
    (d) prior to (c), supplying at least a portion of the reaction effluent to a solid separation step to remove at least part of the catalyst.

13. The process of claim 12 wherein the solid separation step is selected from separation by particle size and separation by density.

14. The process of claim 1, wherein the additional water is supplied to a gaseous portion of the reaction effluent in a condenser such that unreacted ammonia is removed from the reaction effluent portion as an aqueous ammonia-containing condensate.

15. The process of claim 1, wherein the dinitrile is adiponitrile.

* * * * *